United States Patent [19]

Meyer et al.

[11] 4,221,765
[45] Sep. 9, 1980

[54] PURIFICATION OF NICKEL CHLORIDE SOLUTIONS

[75] Inventors: Gustavo A. Meyer; Mark A. Peters, both of Arvada; Helen S. Leaver, Pine, all of Colo.

[73] Assignee: Amax Inc., Greenwich, Conn.

[21] Appl. No.: 12,782

[22] Filed: Feb. 16, 1979

[51] Int. Cl.[2] .......................................... C01G 53/08
[52] U.S. Cl. ..................................... 423/24; 423/100; 423/139
[58] Field of Search ............... 423/24, 100, 139, 493; 75/101 BE

[56] References Cited

U.S. PATENT DOCUMENTS

| | | | |
|---|---|---|---|
| 3,085,054 | 4/1963 | Thornhill | 423/139 |
| 3,441,372 | 4/1969 | Pegler | 423/100 |
| 3,988,224 | 10/1976 | Barriere | 423/100 |
| 4,054,638 | 10/1977 | Dreulle | 423/139 |
| 4,113,588 | 9/1978 | Watanabe | 423/139 |

OTHER PUBLICATIONS

Olsen, "Solvent Extraction of Chlorocomplexes by Triisooctylamine/Carbon Tetrachloride from Hydrochloric Acid Medium", *Acta Chemica Scandanavica* 20, (1966), pp. 1621-1625.

*Primary Examiner*—Brian E. Hearn
*Attorney, Agent, or Firm*—Michael A. Ciomek; Eugene J. Kalil

[57] ABSTRACT

Aqueous nickel chloride solutions containing such impurities as copper, iron, and zinc, and optionally, cobalt, and having an acid concentration ranging from about 0.2 N to 4 N HCl together with a total chloride concentration of about 4 N to 11 N are purified of said impurities by solvent extraction with an organic extractant of essentially tributyl phosphate (TBP) dissolved in a water-immiscible organic solvent, the solvent extraction being carried out at a selected concentration of TBP and a selected volume ratio of organic to the aqueous solution effective to produce a nickel raffinate substantially impoverished in said impurities.

65 Claims, 9 Drawing Figures

PURIFICATION OF NICKEL CHLORIDE SOLUTIONS

This invention relates to the purification of nickel chloride solutions, such as nickel chloride-hydrochloric acid leaching solutions obtained in the leaching of nickeliferous sulfide material, the solutions generally containing, in addition to cobalt, such impurities as copper, iron, and zinc.

STATE OF THE ART

It is known to recover nickel and cobalt from laterite ores by leaching an aqueous pulp of the ore with sulfuric acid at elevated temperature and pressure in an autoclave. The pregnant liquor produced is adjusted with a neutralizing agent (e.g., $Mg(OH)_2$, high magnesium-containing ore, coral mud, and the like) to raise the pH to a value conducive to the precipitation of nickel and cobalt sulfides with $H_2S$. The sulfide precipitate is washed and thickened to a high solids content (e.g., 65% solids) and then oxidized at elevated temperature and pressure in a dilute sulfuric acid solution (e.g., 1%), a solution containing nickel and cobalt sulfate being formed. The nickel and cobalt are thereafter recovered by known methods.

In co-pending application Ser. No. 12,781, filed Feb. 16, 1979, the disclosure of which is incorporated herein by reference, a method is proposed for recovering nickel and cobalt from the sulfide precipitate wherein the precipitate is preferably thermally activated to enhance its activity to leaching with hydrochloric acid at ambient pressure and at solution temperatures ranging from over 50° C. to boiling. With this method, fairly concentrated nickel chloride solutions are obtainable containing more than about 50 grams/liter (gpl) of nickel, some cobalt, and one or more of such impurities as copper, iron, and zinc.

It would be desirable to provide a process for extracting impurities from the leach solution, as well as the cobalt, in order to provide a nickel solution of sufficient purity for the subsequent recovery of a marketable nickel product therefrom.

OBJECTS OF THE INVENTION

It is thus an object of the invention to provide a process for separating impurities from aqueous nickel chloride-hydrochloric acid solutions.

Another object is to provide a solvent extraction process for purifying nickel chloride solutions containing, in addition to cobalt, at least one impurity selected from the group consisting of copper, iron, and zinc.

These and other objects will more clearly appear from the following disclosure and the accompanying drawings, wherein.

STATEMENT OF THE INVENTION

Figure 1:
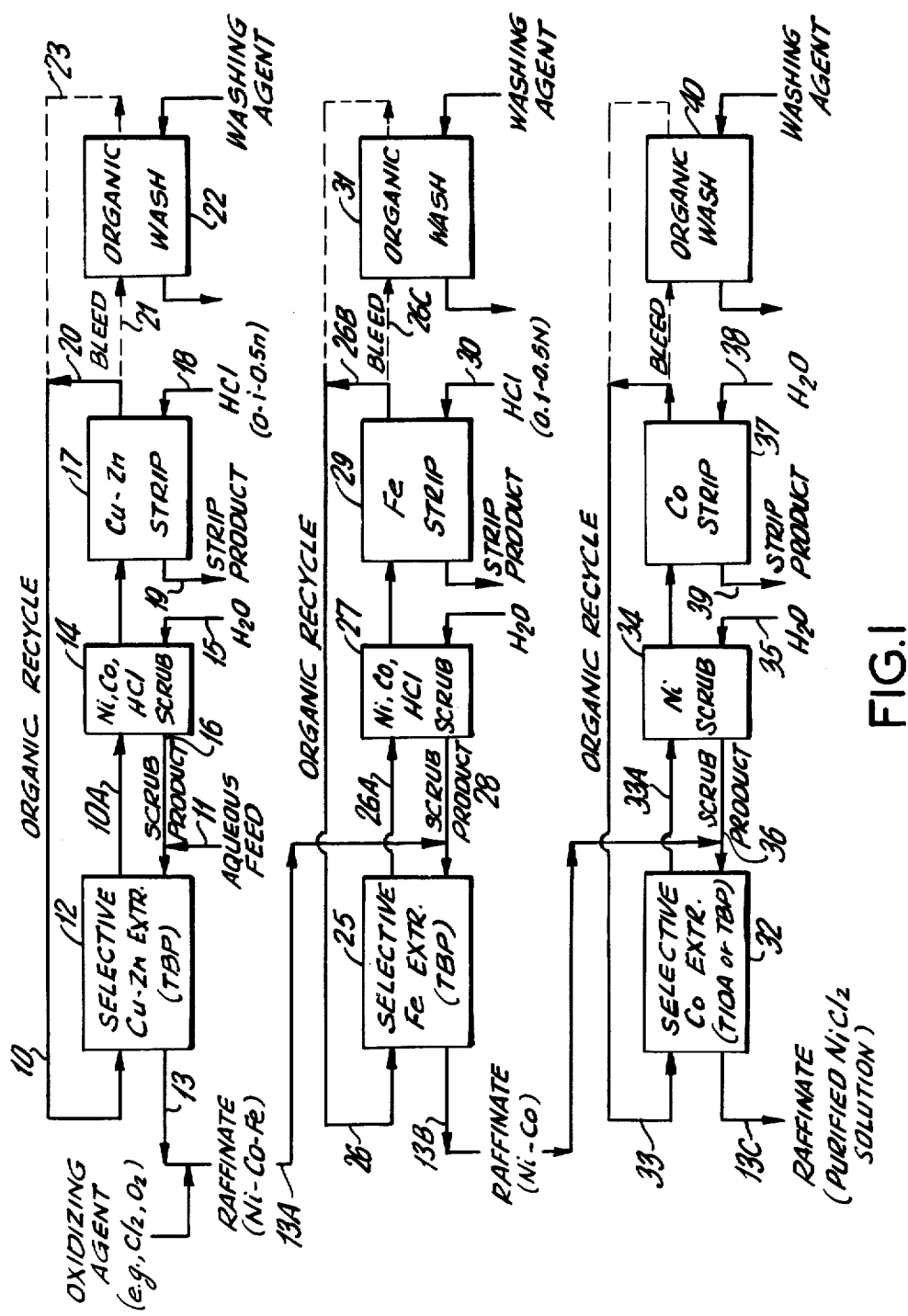
FIGS. 1 to 3 are various embodiments of solvent extraction flow sheets for separating impurities from nickel chloride-hydrochloride acid solutions.

The present invention provides a process for the efficient separation of impurities from nickel chloride-hydrochloric acid solutions using solvent extraction techniques, particularly from nickel chloride solutions containing at least about 50 grams/liter (gpl) of nickel, for example, 50 gpl to 320 gpl nickel, optionally at least about 1 gpl cobalt, and at least one of the impurities copper, iron and zinc.

It has been found that by controlling the HCl normality, the total chloride ion concentration and the concentration of the organic extractant, the impurities can be efficiently separated from the nickel chloride solution while minimizing the problems associated with the subsequent stripping of the impurities from the extractant.

In one embodiment of the invention, the impurities may be selectively extracted from the nickel solution and leave the cobalt, if any, with the nickel raffinate solution to provide a secondary nickel product; or, following separation of the impurities, the cobalt may be then extracted from the nickel raffinate solution by solvent extraction to provide a high purity nickel product.

In another embodiment, both the cobalt and the impurities may be separated together from the nickel solution and the cobalt then selectively separated from the impurities by stripping. Thus, a high purity nickel solution can similarly be prepared by this embodiment.

Broadly stated, the invention is directed to an improved solvent extraction process for removing impurities from an aqueous nickel chloride acid solution containing about 50 gpl to 320 gpl Ni, optionally at least about 1 gpl Co, and at least one impurity selected from the group consisting of Cu, Fe (II) and/or Fe (III), and Zn, the improvement residing in providing said nickel chloride solution with a selected free hydrochloric acid concentration of about 0.2 N to 4 N and a total chloride content of about 4 to 11 N, mixing the aqueous solution with a solution of an organic extractant of concentration ranging from about 5% to 70% by volume of tributyl phosphate (TBP) dissolved in a water-immiscible organic solvent, the volume ratio of the organic solution to the aqueous solution (O/A ratio) being selected in accordance with the equilibrium molar ratio of the concentration of the impurity or impurities in the organic solution to that in the aqueous solution, and then separating the organic solution from the nickel-containing aqueous solution to provide a nickel chloride solution substantially impoverished in said impurity. The O/A volume ratio may advantageously range from about 1 to 15. The O/A ratios required can be easily determined by those skilled in the art.

In selecting a given extractant concentration from the stated range of 5% to 70% by volume of tributyl phosphate, the parameters considered are the total chloride concentration of the aqueous feed solution, the free acid concentration and the concentration level of the impurities to be removed from the aqueous solution.

For example, in working with nickel chloride feed solutions containing 50 to 170 gpl nickel and free acid in the range of 0.2 to 4 N HCl, the extractant concentration may depend on whether copper and zinc are first removed from the solution if iron is in the ferrous state or whether iron, copper, and zinc are selectively removed together if substantially all of the iron is in the ferric state. If substantially all of the iron is in the ferrous state, and the copper and zinc are to be selectively removed, the extractant concentration may range from about 15 to 70 vol.%, and preferably from about 15 to 50 vol.% of TBP. Following removal of the copper and zinc, the iron in the nickel raffinate would be oxidized to the ferric state and extracted using an extractant concentration ranging from about 5 to 70 vol.% TBP and preferably from about 5 to 35 vol.%, the latter range being more preferred as it provides a loaded organic which is capable of being easily stripped of the iron. Where the situation is such that the iron, copper, and zinc are removed together, the TBP concentration would preferably range from about 15 to 50 vol.%, provided that the redox potential of the solution relative to the Standard Calomel Electrode is such as to maintain the copper in the extractable form.

As regards the cobalt which remains with the nickel in the raffinate, it can either be extracted with TBP at a relatively high concentration of about 50 to 70 vol.% or by employing an organic solution of tri-iso-octylamine (TIOA), e.g., up to about 30 vol.%, the latter extractant being more preferred.

Where the feed solution contains 170 to 320 gpl nickel and free acid in the range of 0.2 to 4 N HCl, the TBP concentration, whether removing iron, copper, and zinc together or just copper and zinc, will be selected from the range of 15 to 70 vol.%. In the case where iron, copper, and zinc are extracted together, and the redox potential of the solution is conducive to the extraction of copper a preferred concentration range for the TBP is 15 to 50 vol.%. Where copper and zinc are removed together, the preferred concentration range is 15 to 50 vol.%. Where iron is removed separately following the removal of copper and zinc, the TBP concentration preferably ranges from 5 to 35%.

The removal of cobalt from the high nickel chloride solutions can similarly be accomplished by employing a TBP concentration of about 25 to 50 vol.% or by using an organic solution of TIOA.

Where the cobalt and all of the impurities are extracted together from the nickel chloride solution, the TBP concentration ranges from 20 to 70 vol.% and preferably from 25 to 50 vol.%. It is advantageous in extracting cobalt with the impurities to have a free HCl content of at least about 0.5 N, e.g., about 1 to 2 N.

When the solution contains copper as an impurity, it is important that the redox potential of the solution relative to the Standard Calomel Electrode be controlled at a value substantially less than 600 mv conducive to maintaining a substantial portion of the copper in the extractable state, for example, at a value less than about 500 and advantageously less than about 450 or 400 mv. If it is desired that substantially all of the copper be separated from the nickel solution, it is preferred that the redox potential be controlled at a value less than about 400 mv, e.g., 350 or less.

When iron is present in the nickel chloride solution together with copper, the conditions favorable to the extraction of copper as stated hereinabove can be controlled and manipulated in accordance with the oxidation state of the iron present.

If substantially all of the iron is in the ferrous state ($Fe^{2+}$), the solvent extraction will be selective to copper and to any zinc present but not to the iron as evidenced by the fact that substantial amounts of ferrous iron remain with the nickel in the raffinate. To remove the iron from the raffinate, the iron must be oxidized to the ferric state and then extracted with the organic solvent.

If the iron in solution is substantially all in the ferric state, tests have indicated that the redox potential will be such that the copper will exhibit poor extractability. On the other hand, if the solution containing the iron is slightly underoxidized, for example, contains a small but effective amount of upwards of 200 or 500 ppm of iron in the ferrous state, the copper is easily extractable since the redox potential will be favorable to maintaining the copper in the extractable state.

Generally speaking, when nickeliferous sulfide material is leached with hydrochloric acid, the iron contained in the leach solution is substantially in the reduced state. In purifying such solutions by solvent extraction, it would be first advantageous to oxidize it to the point in which the solution relative to the iron content is slightly under-oxidized to leave in a small but effective amount of ferrous ions sufficient to provide the proper redox potential conducive to maintaining the copper in the extractable state while still extracting substantially all of the iron from solution.

To illustrate the importance of controlling the redox potential of the solution with respect to copper removal, several solvent extraction tests were conducted at various redox potentials referenced to the Standard Calomel Electrode.

A synthetic feed solution was prepared having a redox potential of about 340 mv, the solution containing 116 gpl Ni, 3.2 gpl Fe, 0.48 gpl Cu, 1.6 gpl Zn, and 1.88 N HCl. In carrying out each of the tests, a portion of the aqueous solution was mixed at an O/A ratio of 1:1 with the organic solvent containing 35 vol.% TBP and the solutions mixed by shaking and then allowed to separate. Only a single-contact extraction was employed in each test.

The results obtained with the solution at a redox potential of 340 mv showed that substantially all of the iron was in the ferrous state ($Fe^{2+}$) of which 2.71 gpl reported in the raffinate, thus indicating that only 15.3% of the iron was extracted by the organic solvent. On the other hand, the raffinate only contained of 0.05 gpl Cu, thus indicating that 89.6% or a substantial portion of the copper was extracted.

A portion of the feed solution was then oxidized to increase the redox potential to 416 mv by adding potassium dichromate and the solution then subjected to a single-contact extraction step with TBP. The raffinate contained 1.2 gpl Fe and 0.08 gpl Cu. The iron in the nickel raffinate was substantially Fe (II). About 62.5% of the iron was extracted and 83.3% of the copper. Thus, a larger portion of the iron was in the ferric state. However, a major portion of the copper was extractable due to the presence of substantial amounts of Fe (II) in the aqueous solution.

When a portion of the feed solution was increased in redox potential to 482 mv by the addition of potassium dichromate, substantially all of the iron which was in the ferric state was extracted; whereas, about 35% of the copper was extracted, which is still fairly substantial. When the redox potential was increased to 985 mv, all of the iron was extracted. Whereas, only about 2.1% of the copper was extracted, thus indicating that the redox potential was not favorable to the extraction of copper, especially where all of the iron is in the ferric state.

In addition to the foregoing tests, another nickel chloride solution was tested containing 126 gpl Ni, 197 N HCl, 3.8 gpl Fe, 0.66 gpl Cu and 1.52 gpl Zn. The solution which had a redox potential of 368 mv was increased by oxidation of the iron to 482 mv by the addition of potassium dichromate. As in the previous tests, the solvent extraction was carried out in a single-contact stage at an O/A ratio of 1:1 with the organic solvent containing 35% TBP. The raffinate contained of 0.005 gpl Fe (5 ppm) and 0.54 gpl Cu. Only 18% of the Cu was extracted while over 99% of the iron was removed. This indicates the importance of having a small but effective amount of Fe (II) present to maintain the copper in the extractable state, especially in the situation where all the impurities (Fe, Cu and Zn) are extracted together with the organic extractant.

As stated hereinabove, the small but effective amount of ferrous iron may advantageously range up to about 200 ppm or higher. It may be retained with the nickel solution to produce a marketable product or it may be oxidized (e.g., $Cl_2$, $O_2$, or air) to the ferric state and removed by solvent extraction.

While reference is made herein to Fe (II), Fe (III), Cu, Zn, etc., it is to be understood that the foregoing elements, including cobalt, are substantially complexed with chlorine and exist in the form of anionic chlorocomplexes.

An advantage of the process is that different flow sheets may be employed for carrying out the various embodiments of the invention. As illustrative of such flow sheets reference is made to FIGS. 1 to 3.

FIG. 1 is particularly adapted for treating nickel solutions containing iron substantially in the ferrous state [Fe (II)] such that the impurities copper and zinc are first selectively removed, with the cobalt and iron remaining substantially in the nickel raffinate.

Thus, referring to FIG. 1, the organic extractant 10 (TBP) is fed countercurrent to aqueous feed 11 into a multi-stage solvent extraction section 12, e.g., 6 stages, the aqueous feed flowing from the last stage to the first stage and out at 13 as the organic extractant flows from the first stage to the last stage and out as loaded organic 10A which contains some Ni, Co and some HCl in addition to the impurities Cu and Zn. The loaded organic is scrubbed with water 15 (e.g., 2 stages) at scrubber 14 to remove retained nickel and cobalt, the scrub product 15 being recycled to aqueous feed 11.

The loaded organic 10A is passed through stripper 17 (e.g., 4 stages) where it is stripped of Cu and Zn with water or an aqueous solution 18 containing about 0.1 to 0.5 N HCl to provide a stripped product 19 containing said impurities. The organic extractant is recycled at 20 with a portion of the organic going to bleed at 21 and through the wash section 22 where the stripped organic 21 is cleaned for recycle via line 23 to the solvent extraction section 12. The cleaning operation comprises a caustic wash followed by an acid wash to remove emulsion-forming degradation products.

In the meantime, the nickel raffinate 13 is subjected to oxidation with, for example, oxygen, chlorine gas or air to oxidize Fe (II) to Fe (III). The oxidized raffinate 13A containing Ni, Co and Fe is then passed through a multistage solvent extraction section 25 (e.g., 2 stages) where it mixes countercurrently with organic extractant 26 which contains TBP (e.g., 35% by volume), the loaded organic 26A going to water scrubber 27 for removing residual Ni, Co and HCl. The water-scrubbed product 28 is joined with raffinate feed 13A, a Ni raffinate 13C being produced containing cobalt but being substantially impoverished of the impurities, the Ni raffinate going to cobalt removal to be discussed later.

The scrubbed organic is passed to the iron strip section where the organic is stripped of the iron with water or a dilute HCl solution 30 containing 0.1 to 0.5 N HCl, and form a strip product containing Fe (III) the stripped organic 26B being substantially recycled to selective iron extraction section 25, a portion of the stripped organic being passed as a bleed 26C to organic wash 31 where the stripped organic is cleaned as aforesaid.

The nickel raffinate 13B free of the impurities is passed to selective cobalt multi-staged extraction section 32 (e.g., 6 stages) countercurrent to the feed of organic extractant 33 which may contain either tri-isooctylamine (TIOA) or tributyl phosphate (TBP) as stated herein. A raffinate 13C of purified nickel solution is produced. The cobalt loaded organic 33A is passed to nickel scrubber 34 where residual nickel is removed via a water scrub 35 to produce a scrub product which joins nickel raffinate 13B entering cobalt extraction section 32. The cobalt is stripped from the organic at 37 (e.g., 6 stages) using water to form a stripped product containing the cobalt, the stripped organic 33B being substantially recycled to multistage section 32, a portion of the stripped organic being removed as bleed 33C which is cleaned at 40 for recycle to cobalt extraction section 32.

An advantage of the foregoing flow sheet is that it can be used on hydrochloric acid leach solutions obtained in the leaching of nickeliferous sulfide material in which the iron is in the substantially reduced state. By first removing the copper and zinc, the iron can later be extracted from the nickel raffinate by oxidizing it to the ferric state, i.e., Fe (III).

Figure 2:
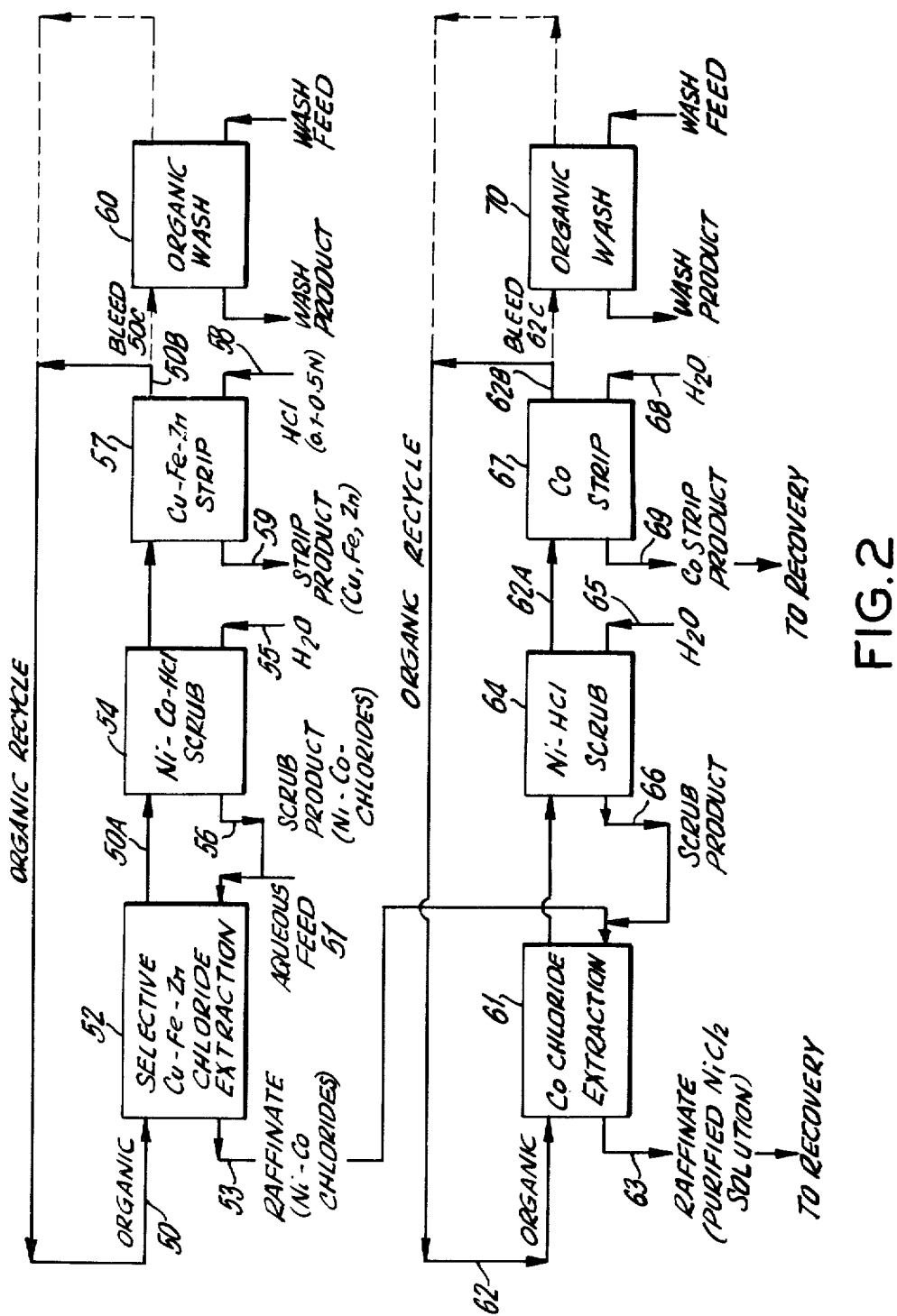

In FIG. 2, the solvent extraction is selective to the removal of copper iron and zinc. In this case, the iron is in substantially the oxidized state but is slightly underoxidized to provide for the presence of a small but effective amount of Fe (II) sufficient to maintain the copper in the extractable form, for example, a small but effective amount ranging up to about 200 ppm or higher of Fe (II).

Referring now to FIG. 2, the organic extractant (TBP) 50 is fed countercurrent to aqueous feed 51 into a multi-stage solvent extraction section 52, for example, 6 stages, the aqueous feed flowing from the last stage to the 1st stage and out as the organic extractant flows from the 1st stage to the last stage and out as loaded organic 50A.

The aqueous feed is converted to a Ni-Co raffinate 53 which is later treated by solvent extraction to remove the cobalt from the aqueous solution. In the meantime, the loaded organic 50A is passed through scrubber 54 (e.g., 2 stages) where it is scrubbed with water 55 to remove retained nickel, cobalt and acid from the loaded organic, the scrub product 56 being then recycled to aqueous feed 51 for recovery in the raffinate.

The organic 50A loaded with the impurities is passed through stripper 57 (e.g., 4 stages) where it is treated with water or 0.1 to 0.5 N HCl solution 58 to provide a strip product 59 of Cu, Fe and Zn, the stripped organic 50B recycled to feed organic 50, a portion of the stripped organic going as bleed 50C to wash section 6 to clean up the organic. The cleaning operation comprises a caustic wash followed by an acid wash to remove emulsion-forming degradation products of TBP.

The raffinate 53 is subjected to solvent extraction at solvent extraction section 61, the raffinate being fed countercurrently to an organic solvent 62 selective to the removal of cobalt, such as tri-iso-octylamine or TBP, to provide a purified nickel chloride solution 63, the cobalt-loaded organic passing to nickel scrub 64 where the nickel is scrubbed with water 65 to form scrub product 66 which is recycled to solvent extraction section 61. The cobalt-loaded organic passes through cobalt strip 67 in which the cobalt is stripped with water 68 flowing countercurrently to organic 62A to provide a cobalt strip product 69 which goes to recovery, the stripped organic 62B being substantially recycled to organic feed 62, a portion of the organic 62C going as bleed to wash section 70 and subjected to a cleaning operation as stated earlier in the first part of the process for recycle into the solvent extraction process.

The nickel raffinate 63 will have a fairly high purity relative to the iron content since the small amount of Fe (II) in the solution can be controlled to within specification limits and still be sufficient to maintain the copper in extractable form.

Figure 3:
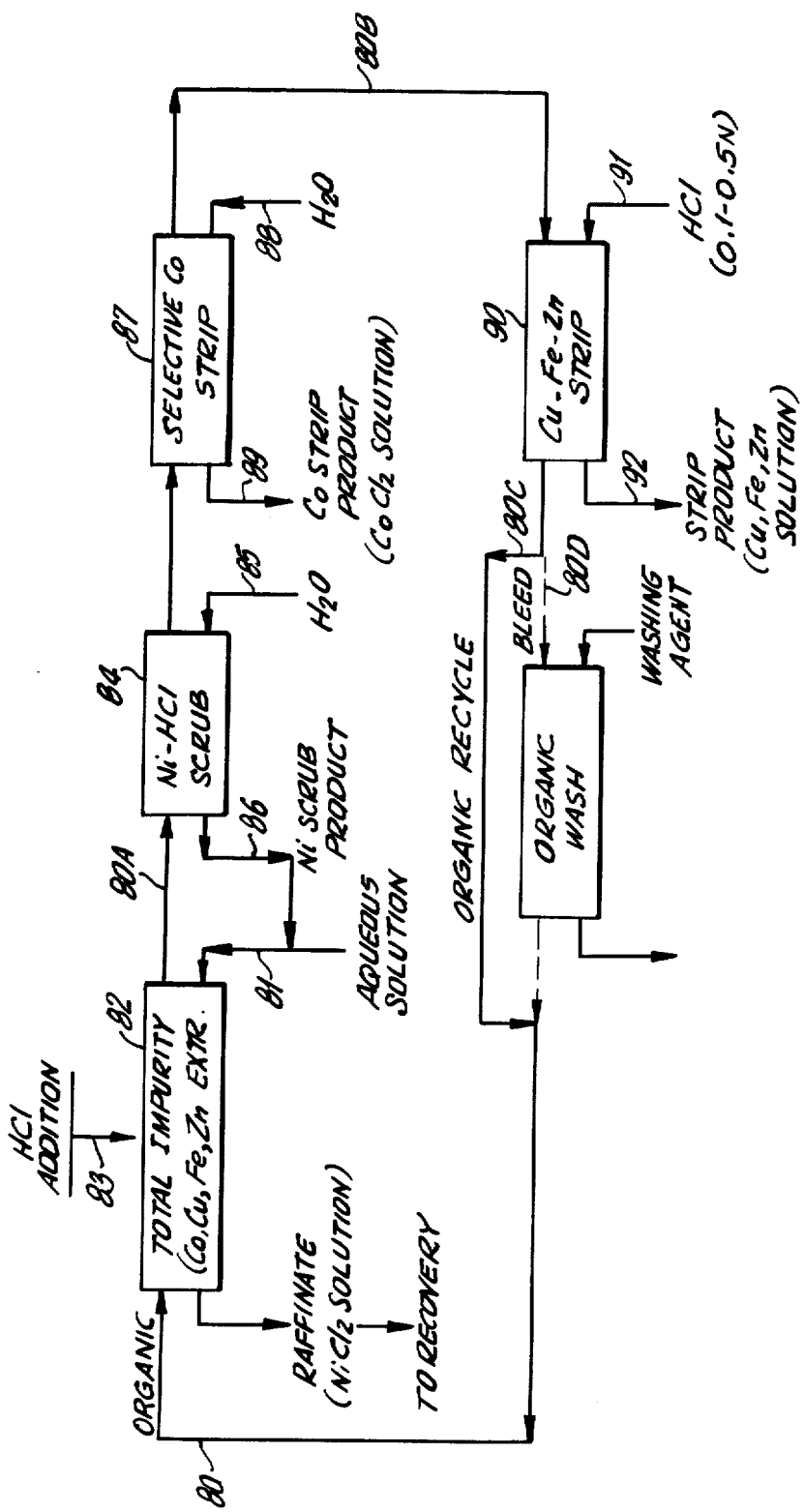

The flow sheet of FIG. 3 illustrates the total removal of Co, Cu, Fe and Zn in the solvent extraction section, in which the loaded organic after scrubbing is stripped of the cobalt and the cobalt-stripped organic then subsequently stripped of the impurities. The iron is substantially in the ferric state together with a small but effective amount of Fe (II).

This flow sheet is particularly applicable to solutions containing 170 to 320 gpl Ni and at least about 1 gpl Co (e.g., 3 to 50 gpl Co, such as 5-25 gpl Co).

Referring now to FIG. 3, the organic extractant 80 (TBP) is fed countercurrent to aqueous feed 81 into a solvent extraction section 82 (6 stages), an acid addition 83 also being provided, when necessary, to augment selectivity for the extraction of cobalt. A raffinate 83A of fairly high purity nickel chloride solution is produced which goes to recovery.

The loaded organic 80A is passed through nickel scrub 84 where it is scrubbed countercurrently with water 85, the nickel scrub product 86 being recycled to solvent extraction section 82, the scrubbed organic 80A loaded with cobalt and impurities then going to selective cobalt strip 87 where the cobalt is stripped with water 88 to provide a fairly high purity $CoCl_2$ solution 89. The stripped organic 80B is passed through Cu-Fe-Zn strip 90 where it is scrubbed with 0.1 to 0.5 N HCl 91 to remove the impurities as strip product 92.

The stripped organic 80C is substantially recycled to solvent extraction section 82 with a portion of the organic 80D going to wash section 93 and from there recycled to the solvent extraction section.

Details of the Invention

As illustrative of the various embodiments of the invention, the following examples are given:

EXAMPLE 1

A simulated matte leach liquor was prepared containing 90 grams per liter (gpl) nickel and 79 gpl HCl together with Co, Cu, Fe, and Zn. The iron was substantially all in the ferrous state. The Feed (I) was subjected to solvent extraction at 25° C. using an organic solution comprising Solvesso 150 (water immiscible aromatic hydrocarbon) containing 35 vol. % tributyl phosphate (TBP). The aromatic hydrocarbon contains by weight 8% $C_9$, 74% $C_{10}$, 15% $C_{11}$, and 1% $C_{12}$ aromatics. The results of the test are as follows:

| Solution | O/A Ratio | Organic Flow, l/min.* | Grams Per Liter | | | | | |
|---|---|---|---|---|---|---|---|---|
| | | | Ni | Co | Cu | Fe | Zn | HCl |
| (I) Feed | 4 | 0.24 | 90 | 4.4 | 0.22 | 2.6 | 1.8 | 79 |
| Raffinate | — | — | 92 | 4.4 | <.002 | 2.8 | 0.02 | 61 |

*liter per minute

The slight increase in nickel and iron in the raffinate may be attributed to changes in solution volume, e.g., through evaporation, etc. As will be noted, substantially all of the iron and cobalt remained with the raffinate along with the nickel while over about 98% of the copper and over 98% of the zinc were extracted.

In the next step of the process, all of the iron in the raffinate is oxidized to the ferric state and then removed using the organic solvent as in the extraction of copper and zinc.

The HCl concentration in the feed was about 2.17 N (79 gpl) and in the raffinate about 1.83 N (67 gpl). Following removal of the oxidized iron, the cobalt can then be removed from the nickel using an organic solvent selective to cobalt, e.g., an organic solution containing tri-iso-octylamine.

EXAMPLE 2

The following data illustrate nickel solutions [Feeds (II) to (VII)] containing iron in which a substantial portion of the iron is in the ferric state with the remainder in the ferrous state. The conditions were the same as Example 1.

| Solution | | O/A Ratio | Organic Flow, l/min. | Grams Per Liter | | | | | |
|---|---|---|---|---|---|---|---|---|---|
| | | | | Ni | Co | Cu | Fe | Zn | HCl |
| (II) | Feed | 2 | 0.16 | 112 | 4.2 | .22 | 2.6 | 1.8 | 79 |
| | Raffinate | — | — | 96 | 4.4 | .004 | .28 | .2 | — |
| (III) | Feed | 2 | 0.16 | 108 | 4.6 | 0.3 | 1.94 | 1.3 | 74 |
| | Raffinate | — | — | 108 | 4.8 | .002 | .82 | .08 | 70 |
| (IV) | Feed | 3 | 0.24 | 108 | 4.6 | 0.3 | 1.94 | 1.3 | 74 |
| | Raffinate | — | — | 108 | 4.8 | <.002 | .76 | .01 | 66 |
| (V) | Feed | 2 | 0.16 | 104 | 4.8 | 2.1 | 2.04 | 1.66 | 74 |
| | Raffinate | — | — | 103 | 4.6 | <.002 | .50 | .046 | 69 |
| (VI) | Feed | 3 | 0.24 | 104 | 4.8 | 2.1 | 2.06 | 1.66 | 74 |
| | Raffinate | — | — | 104 | 5.0 | .002 | .56 | .03 | 67 |
| (VII) | Feed | 4 | 0.24 | 104 | 4.8 | 2.1 | 2.04 | 1.66 | 74 |

| Solution | O/A Ratio | Organic Flow, l/min. | Grams Per Liter | | | | | |
|---|---|---|---|---|---|---|---|---|
| | | | Ni | Co | Cu | Fe | Zn | HCl |
| Raffinate | — | — | 104 | 5.0 | <.002 | .50 | .012 | 67 |

As will be observed from the data, substantial amounts of the ferrous iron remains in the raffinate, i.e., 0.28 to 0.82 gpl (280 to 820 ppm) to provide the condition for the substantial removal of copper, that is, over 99% removal. It will be particularly noted from Feeds (V), (VI), and (VII) that the copper was reduced from 2.1 gpl to 0.002 or less.

The raffinate can be further treated for the removal of iron by oxidizing the iron from $Fe^{2+}$ to $Fe^{3+}$ and then separating the ferric ion by solvent extraction with a 35 vol.% TBP organic solution.

EXAMPLE 3

The following tests illustrate the extent to which the nickel chloride solution can be slightly underoxidized to still provide the condition favorable to the extraction of copper. The solutions were sufficiently underoxidized so that the amount of ferrous iron corresponded to 0.13 and 0.06 gpl $Fe^{2+}$ (or 130 and 60 ppm $Fe^{2+}$) respectively, the solvent extraction conditions being the same as in Examples 1 and 2.

| Solution | | O/A Ratio | Organic Flow, l/min. | Grams Per Liter | | | | | |
|---|---|---|---|---|---|---|---|---|---|
| | | | | Ni | Co | Cu | Fe | Zn | HCl |
| (VIII) | Feed | 3 | 0.24 | 100 | 5.2 | 0.22 | 3.0 | 2.2 | 85 |
| | Raffinate | — | — | 100 | 5.0 | 0.002 | 0.13 | 0.034 | 76 |
| (IX) | Feed | 1 | 0.16 | 108 | 5.1 | 0.3 | 1.94 | 1.66 | 75 |
| | Raffinate | — | — | 108 | 5.0 | 0.002 | 0.06 | 0.21 | 73 |

As will be observed, the small but effective amount of $Fe^{2+}$ in the aqueous solution (the raffinate) was sufficient to provide the necessary conditions for maintaining the copper in the extractable form. Over 99% of the copper was separated from the nickel chloride solution. The amount of iron remaining, which is very small, may report with the nickel to provide a marketable nickel product following removal of cobalt from the solution.

EXAMPLE 4

In order to illustrate further the importance of controlling the redox potential of the nickel chloride solutions to remove effectively the copper together with the other impurities (the chlorocomplexes of Fe, Cu, Zn and Co), two pilot plant runs were conducted using the flow sheet shown in FIG. 3. The following conditions were employed:

| | |
|---|---|
| Temperature: | 35° C. |
| Organic Comp.: | 35 v/o TBP in Solvesso 150 |
| Solvent Extraction: | 6 stages |
| Ni, HCl Scrub: | 2 stages |
| Cobalt Strip: | 6 stages |
| Fe-Cu-Zn Strip: | 4 stages |
| Scrub Solution: | $H_2O$ |
| Cobalt Strip Solution: | $H_2O$ |
| Fe-Cu-Zn Strip Solution: | 0.4N HCl |

The pilot plant conditions for two runs are given below:

| Conditions | Run A | Run B |
|---|---|---|
| Organic Flow (liters/hr) | 815 | 1055 |
| Solvent Extraction O/A Ratio | 5 | 6.6 |
| Ni, HCl Scrub O/A Ratio | 100 | 100 |
| Cobalt Strip O/A Ratio | 42 | 40 |
| Fe-Cu-Zn Strip O/A Ratio | 9.8 | 9.7 |

The following results were obtained:

| Solution | | Grams Per Liter | | | | | | Redox Potential* |
|---|---|---|---|---|---|---|---|---|
| | | Ni | Co | Fe | Cu | Zn | HCl | |
| (A) | Feed | 216 | 11.2 | 4.2 | .47 | 2.8 | 58 | — |
| | Raffinate | 214 | 0.98 | <.001 | .30 | .006 | 31.4 | — |
| (B) | Feed | 225 | 9.6 | 4.0 | 0.6 | 2.7 | 68 | 150 to 230 |
| | Raffinate | 216 | .45 | 1.6 | <.001 | <.001 | 40 | — |

*millivolts, based on Standard Calomel Electrode.

The redox potential of Feed Run B was such that an effective amount of the Fe (II) chlorocomplex was present, while in Feed Run A, the amount of Fe (II) chlorocomplex was very low (note iron content of raffinate in Run A). Run B resulted in total extraction of copper, zinc and most of the cobalt, while in Run A, only a minor amount of copper was extracted.

EXAMPLE 5A

To illustrate the effect to TBP concentration in the organic on the extraction of ferric chlorocomplexes, a series of tests were conducted at 25° C. using conventional shake-out techniques in the laboratory. The aqueous chloride solution contained 114 gpl Ni, 5 gpl Co, <0.002 gpl Cu, 0.027 gpl zinc and varying amounts of iron ranging from 2 to 12 gpl $Fe^{3+}$. The solution contained 70 gpl free HCl. The organic extractant was prepared at various compositions using an aromatic hydrocarbon as the solvent known by the designation Solvesso 150 or Aromatic 150. Concentrations of the constituents in the aqueous solution and the extractant are given in grams per liter (gpl). The distribution coefficients represent the arithmetic ratio of the concentration of a species or constituent in the organic to that concentration in the aqueous solution at equilibrium.

Figure 4:
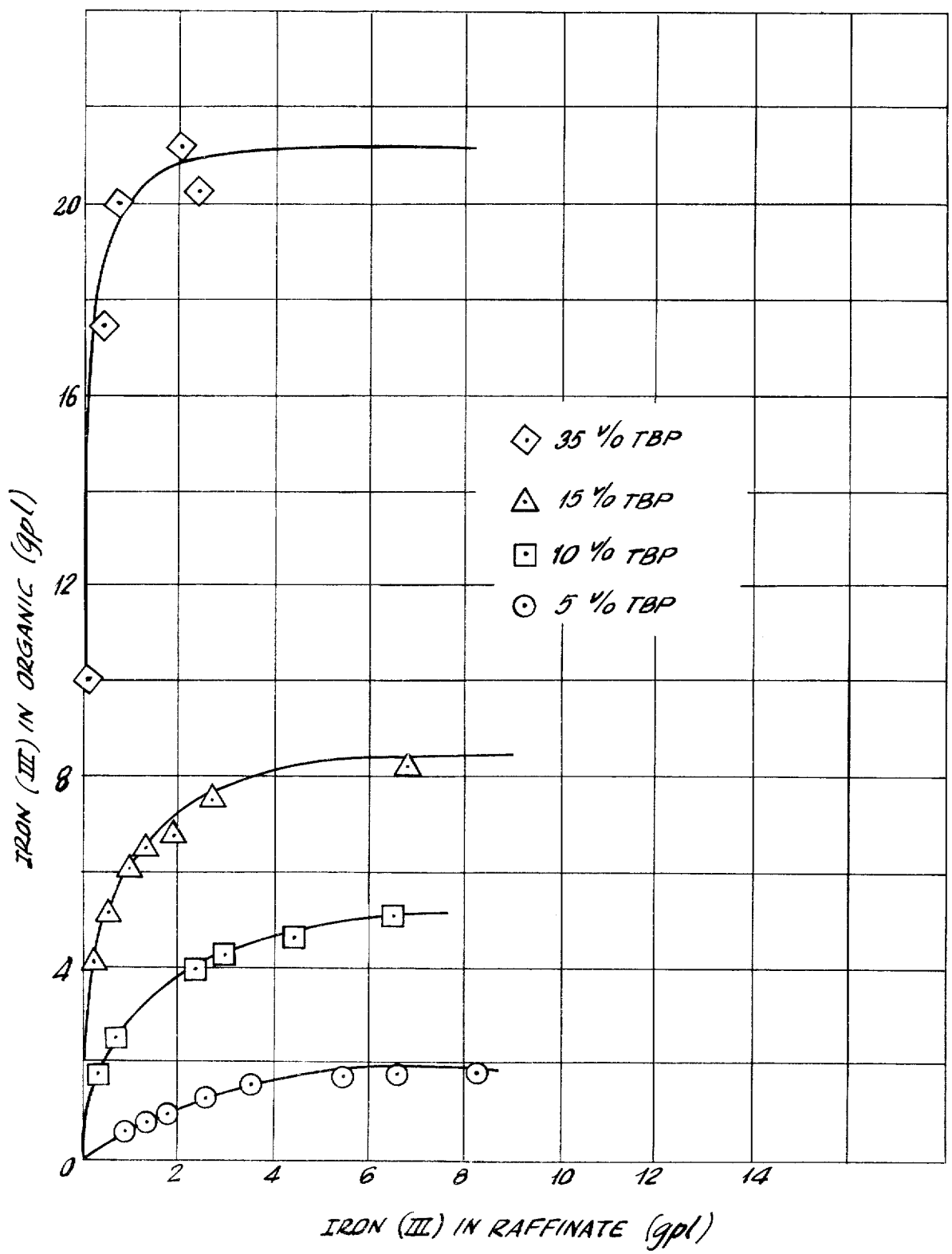
FIG. 4 depicts curves illustrating loading isotherms of iron (III) in an organic solvent containing various concentrations of tributyl phosphate.

Loading equilibrium isotherms for Fe (III) were constructed by contacting the organic with various aqueous solutions containing iron in varying amounts over the range of 2 to 12 gpl $Fe^{3+}$, the concentrations of the other constituents remaining the same. The solutions were contacted at different organic to aqueous solution ratios (O/A). The results are shown in FIG. 4 for extractant compositions containing 5, 10, 15 and 35 volume percent TBP dissolved in Solvesso 150. Referring to the curves, it will be noted that the higher the TBP concentration, the higher is the $Fe^{3+}$ loading in the organic.

In order to establish the stripping characteristics of iron from loaded organics at varying TBP concentrations (i.e., 5, 10, 15 v/o TBP), the organic solvents were loaded with iron (III) chlorocomplexes by contacting them with the aforementioned aqueous solutions at high organic to aqueous solution ratios in order to fully load them with iron (III).

Figure 5:
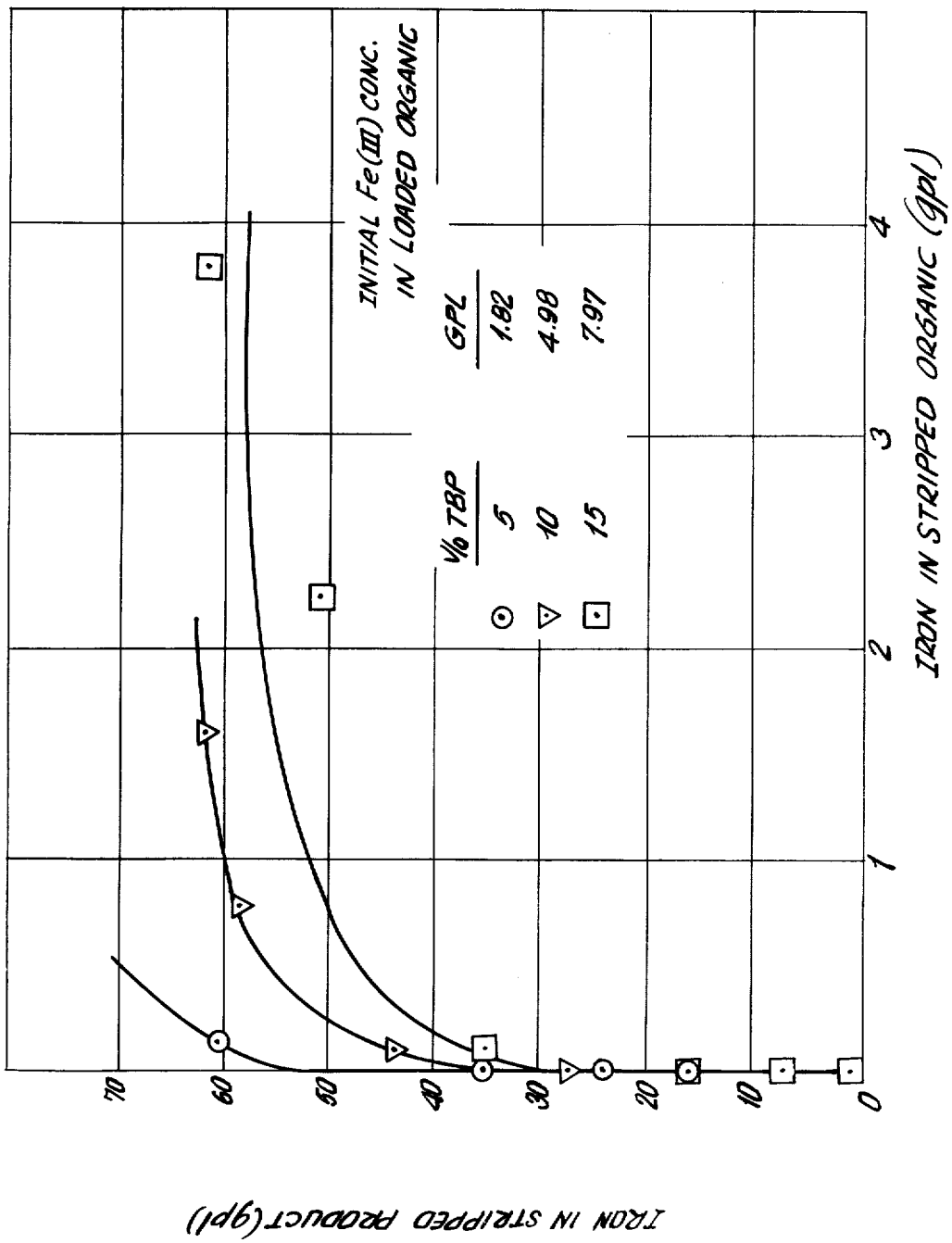
FIG. 5 shows a series of curves illustrating the stripping of iron (III) from loaded organic solutions containing 5, 10 and 15 volume percent of TBP, respectively, using water as a stripping agent.

A stripping equilibrium isotherm was then constructed for each loaded organic by contacting the organic at various O/A ratios using water as the stripping agent. The isotherms obtained are shown in FIG. 5. As will clearly appear from the curves, it is easier to strip iron from the organic solvent containing lower concentrations of TBP as evidenced by the fact that at lower TBP concentrations, more of the iron appears in the strip solution.

The selection of a given TBP concentration will depend on the level of the iron impurity in the nickel chloride solution. Also, the method of iron recovery or disposal will determine the concentration level required in the strip solution.

EXAMPLE 5B

Figure 6:
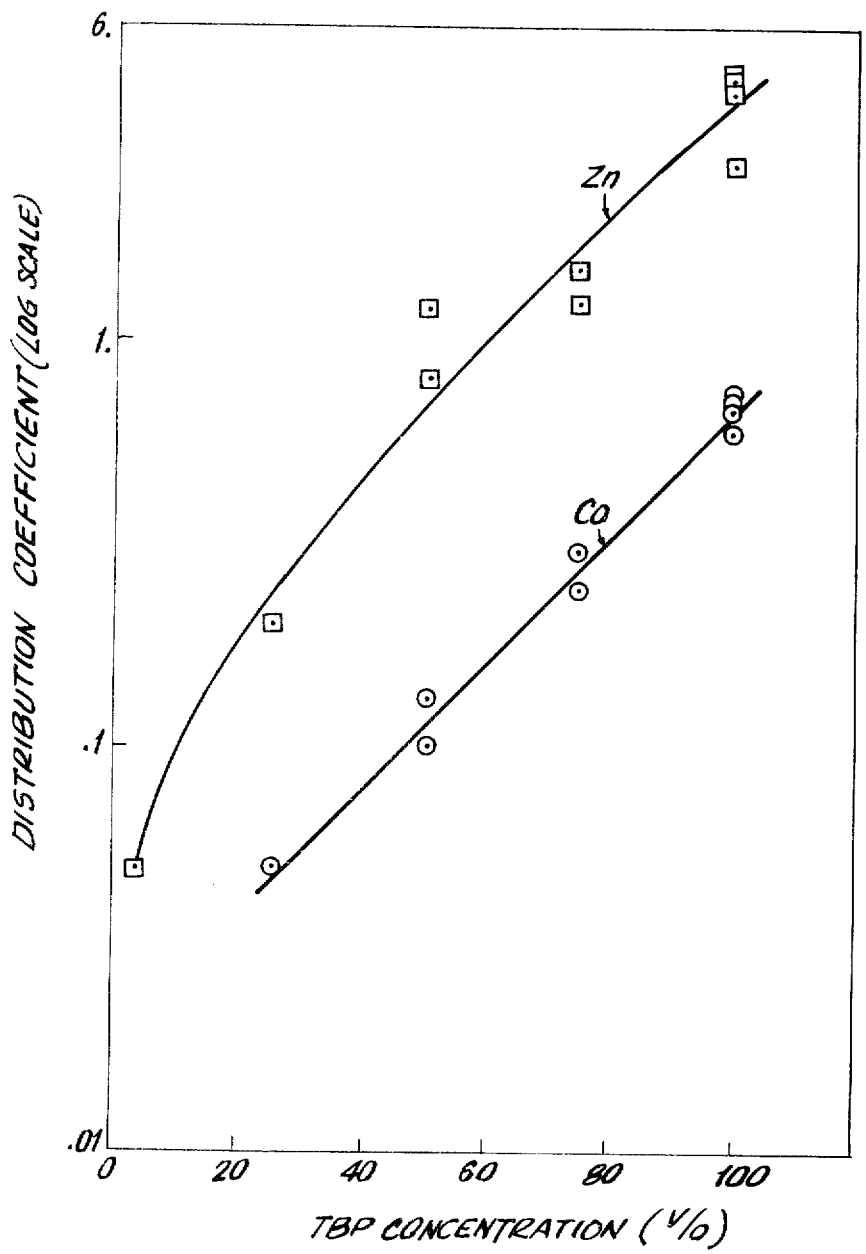
FIG. 6 depicts two curves showing the relationship between the distribution coefficients of zinc and cobalt, respectively as a function of TBP concentration in the organic solvent.

Tests were conducted to illustrate the effect of TBP concentration of the organic solvent on the extraction distribution coefficients of the chlorocomplexes of zinc and cobalt, the data being obtained by employing a series of shake-out tests in which the organic and aqueous solutions are mixed vigorously shaking. The tests were carried out in batches at various concentrations of TBP dissolved in Solvesso 150 at 55° C. and an O/A ratio of 1:1 with a nickel chloride solution containing the metals in question as follows: Ni 270±30 gpl, Co 22±2 gpl, Cu 0.16±0.02 gpl, Fe (II, III) 5±1 gpl, Zn 3.8±0.6 gpl, $Cl^-$ 11±0.5 N and HCl 0.2 N. The relationship was determined by plotting distribution coefficients on the log scale for each of zinc and cobalt versus TBP concentration on the linear scale. The results are shown in FIG. 6.

The data show that higher TBP concentrations in the organic results in higher distribution coefficients for both zinc and cobalt.

EXAMPLE 6

In order to demonstrate the effect of HCl concentration in the aqueous feed on the extractability of Co and Zn using 35 vol.% TBP dissolved in Solvesso 150, a series of batch shake-out tests were conducted. The total chloride of the various aqueous feed was maintained constant (i.e., at 9.5 N $Cl^-$), while the HCl concentration was increased from 0.35 N to 2.8 N, with the nickel concentration decreased from 255 to 181 gpl Ni.

The conditions of the test are given as follows:
Organic: 35 v/o TBP in Solvesso 150
Temperature: 30° C.
O/A Ratio: 5:1
Procedure: Batch Shake-outs

| COMPOSITIONS OF FEED | | | |
|---|---|---|---|
| Ni (gpl) | HCl (N) | Co or Zn (gpl) | Total $Cl^-$ (N) |
| 255 | 0.35 | 11.2/3.4 | 9.5 |
| 240 | 0.85 | 11.2/3.4 | 9.5 |
| 225 | 1.35 | 11.2/3.4 | 9.5 |
| 210 | 1.85 | 11.2/3.4 | 9.5 |
| 196 | 2.35 | 11.2/3.4 | 9.5 |
| 181 | 2.85 | 11.2/3.4 | 9.5 |

Figure 7:
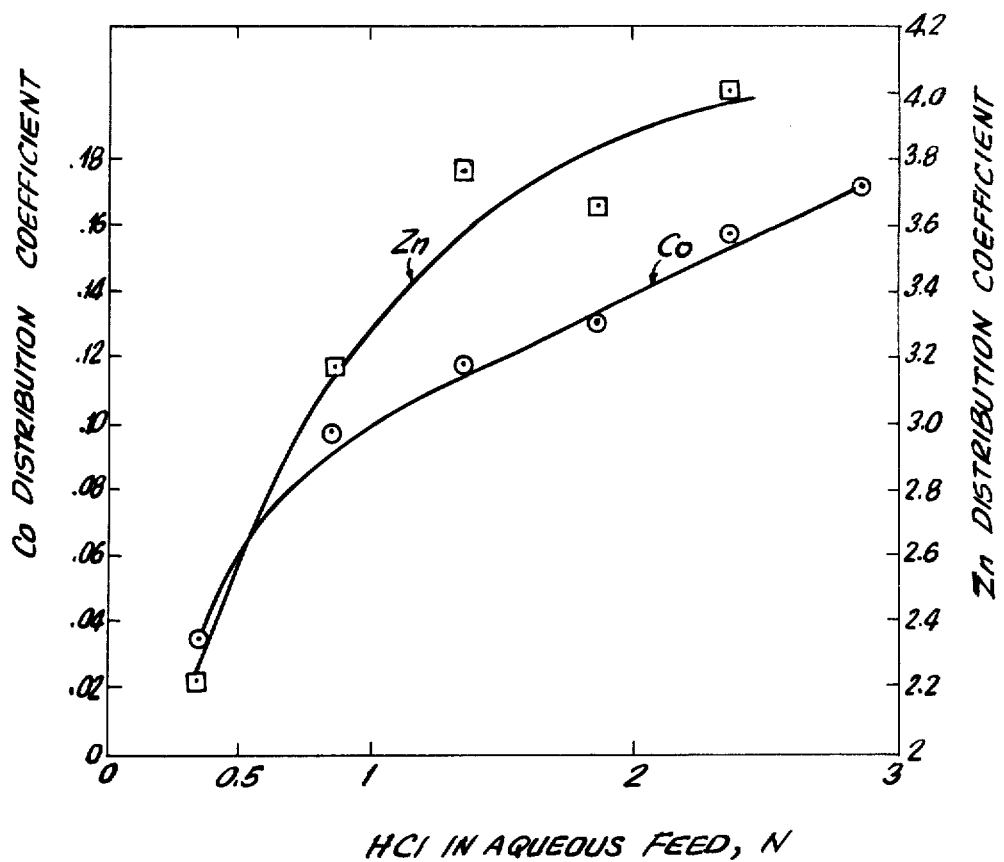
FIG. 7 shows the effect of HCl on the distribution coefficients of zinc and cobalt.

Summarizing the foregoing, it will be apparent from FIG. 7 that for a given TBP concentration and a given total chloride concentration in the nickel chloride solution, a higher free acid results in improved extractability of the metal chlorocomplexes present, in particular, cobalt. In extracting cobalt and all of the impurities together using a TBP concentration of 25 to 50 vol.% and a total chloride concentration of about 6 to 10, it is preferred that the free HCl be at least about 0.5 N and preferably range from about 1 to 2 N. The extraction of cobalt is favored at a higher TBP concentration.

EXAMPLE 7

As further illustrative of the embodiment of the invention depicted in the flow sheet of FIG. 3, results of a mini-plant run are given herewith showing the co-extraction of cobalt with copper, iron and zinc as chlorides from a relatively high chloride aqueous feed.

The run was carried out on a continuous countercurrent basis in conventional mixer-settler units. The organic contained 35 vol.% TBP dissolved in Solvesso 150 and the test conducted at 35° C. The run followed the flow sheet of FIG. 3, except for the omission of the nickel scrub.

The aqueous feed contained 240 gpl Ni, 21.6 gpl Co, 0.16 gpl Cu, 7.2 gpl Fe mostly as Fe (III), 3.7 gpl Zn, 1.8 N free HCl and 10.7 N total chlorides. The impurities Co, Cu, Fe and Zn were extracted with the organic in 6 stages at an O/A ratio 7.3. The feed contained a small but effective amount of Fe (II) in order to maintain the copper in the extractable state. The flow rate was 200 ml/min and the aqueous feed flow rate was 27.4 ml/min. Concentrated HCl was added to several of the mixers (at stages 1, 2, 3 and 4) to raise the HCl content of the aqueous phase as it flowed through the extraction bank of mixers in order to maintain the HCl level of the raffinate at greater than 0.8 N HCl.

The resulting raffinate had the following composition: 200 gpl Ni, 0.09 gpl Co, <0.002 gpl Cu, 0.02 gpl Fe (II), 0.004 gpl Zn, 0.8 N HCl. The ratio of nickel to the impurities is quite high, to wit: Ni/Co $2.2 \times 10^{+3}$, Ni/Cu $1 \times 10^{+5}$, Ni/Fe $1 \times 10^{+4}$ and Ni/Zn $5 \times 10^{+4}$.

The loaded organic contained 0.014 gpl Ni, 2.7 gpl Co, 0.025 gpl Cu, 0.82 gpl Fe, 0.51 gpl Zn, 0.22 N HCl (calculated) and 0.38 N total chloride. The loaded organic was selectively stripped of Co in 4 stages using water at an O/A ratio of 16.3 following which the organic was stripped of Cu, Fe and Zn in 4 stages with 0.4 N HCl at an O/A ratio of 12.7 .

The cobalt strip product contained 6.6 gpl Ni, 44 gpl Co, 0.107 gpl Cu, 0.008 gpl Fe, 1.3 gpl Zn, 3.6 N free HCl and 5.2 N total chlorides. The stripped organic was thereafter washed in one stage with 0.5 N caustic solution at an O/A ratio of 9.4 and then finally washed with 0.4 N HCl at and O/A ratio of 9.2. The washed organic contained 0.008 gpl Fe and 0.006 gpl Zn, the washed organic being then recycled to the main extraction section.

EXAMPLE 8

Figure 8:
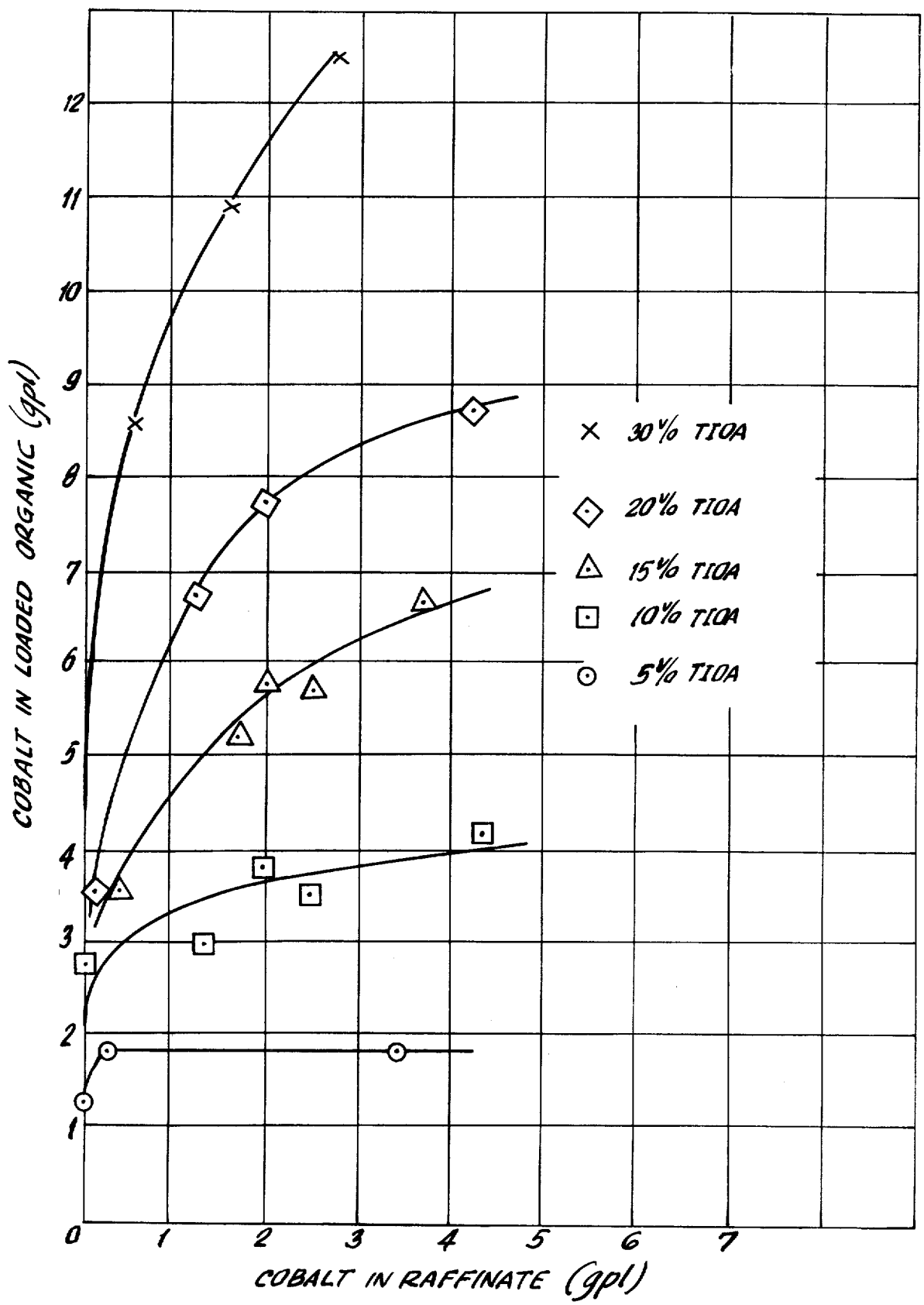
FIG. 8 illustrates a series of curves showing the loading isotherms for cobalt in tri-iso-octylamine of various concentrations.
Figure 9:
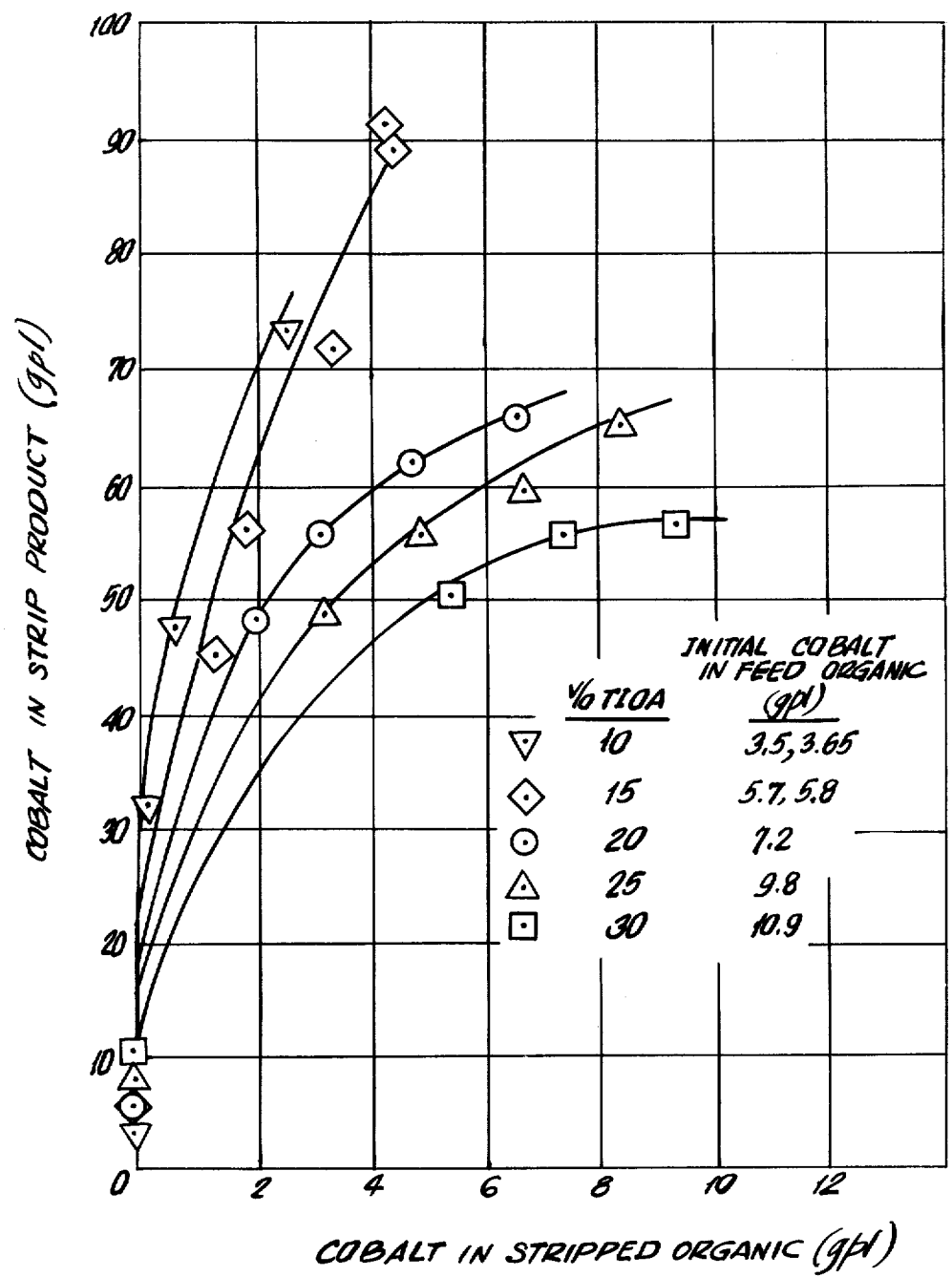
FIG. 9 depicts stripping isotherms of cobalt from loaded organic solvents containing various concentrations of tri-iso-octylamine.

To illustrate the use of tri-iso-octylamine (TIOA) to remove cobalt from nickel chloride solutions, a series of laboratory shake-out tests was conducted to establish loading and stripping equilibrium isotherms (FIGS. 8 and 9).

The aqueous chloride solutions used contained 94 to 100 gpl Ni, 3.9 to 5 gpl Co and 69 to 73 gpl free HCl. All solvent extraction tests were carried out at 25° C. The stripping isotherms were obtained using $H_2O$ as the stripping agent.

The selection of the concentration of TIOA in Solvesso 150 is determined from the amount of cobalt in the nickel chloride feed solution and the cobalt concentrations required in the strip product. In order to improve the solubility of the extracted species in the organic phase, one may advantageously add a modifier, generally a long-chain alcohol in an amount of 1 to 10 vol.%, e.g., isodecanol, etc or operate at slightly higher temperatures.

The stripping isotherms for cobalt from the TIOA solutions are given in FIG. 9.

As has been shown, nickel chloride solutions of fairly high purity can be produced with the method of the invention. The purity of the solution relative to the total content of Co, Fe, Cu and Zn, i.e., the Ni/impurity ratio, may be at least about 200:1, e.g., at least about 500:1, preferably at least about 1000:1.

As stated herein, the foregoing solvent extraction process is particularly applicable to the purification of nickel chloride leach solutions obtained in the leaching of nickeliferous sulfide material, for example, as disclosed in U.S. Application Ser. No. 12,781, filed on Feb. 16, 1979. In the leaching process, the nickeliferous sulfide material in the finely divided state is subjected to hydrochloric acid leaching at ambient pressure and an elevated temperature in excess of 50° C. (e.g., 60° C. to boiling) in an acid solution of normality ranging from about 3 N to about 8 N aqueous HCL to dissolve at least about 50% by weight of the total nickel in the matte until a terminal acid normality of about 0.2 or 0.5 to 5 N is reached. The nickel leach solutions obtained may contain at least about 50 gpl Ni, at least about 1 gpl Co, and such impurities as Cu, Fe and Zn.

The solutions may range in composition from about 50 to 320 gpl Ni, about 3 to 50 gpl Co (e.g., 5 to 25 gpl), together with such impurities as Cu, Fe and Zn, the free acid ranging from about 0.2 to 4 N HCl and the total chloride content ranging from about 4 to 11 N. As stated earlier, leach solutions of the foregoing type can be purified using solvent extraction process provided by the invention.

Although the present invention has been described in conjunction with preferred embodiments, it is to be understood that modifications and variations may be resorted to without departing from the spirit and scope of the invention as those skilled in the art will readily understand. For example, the process can be conducted at temperatures between 10° and 70°, depending upon the nature of the extractant and the feed solution. Such modifications and variations are considered to be within the purview and scope of the invention and the appended claims.

What is claimed is:

1. In a solvent extraction process for removing impurities from an aqueous nickel chloride acid solution containing about 50 gpl to 320 gpl Ni, optionally at least about 1 gpl Co, and at least the impurities copper and iron selected from the group consisting of copper, iron and zinc, the improvement which comprises, providing said solution having a free hydrochloric acid concentration of about 0.2 N to 4 N and a total chloride content of about 4 to 11 N and in which sufficient amount of the iron is in the ferrous state such that the redox potential of the solution is at a value substantially less than 600 mv referenced to the Standard Calomel Electrode to maintain the copper in the extractable form, mixing said solution with an organic extractant of essentially about 5% to 70% by volume of tributyl phosphate dissolved in a water-immiscible organic solvent at a selected organic to aqueous solution volume ratio predetermined to extract substantially said copper from said aqueous solution and form a raffinate containing said nickel and said ferrous iron and a loaded organic containing said copper, and then separating said loaded organic from said raffinate to provide a nickel chloride raffinate solution substantially impoverished in said copper impurity and containing ferrous iron.

2. The process of claim 1, wherein the nickel raffinate is oxidized to convert substantially all of the ferrous iron to the ferric state and the ferric iron thereafter extracted with an organic extractant containing 5 to 70 volume percent tributyl phosphate and provide a nickel raffinate substantially free of said copper and iron impurities.

3. The process of claim 2, wherein the solution also contains zinc and the copper and zinc are extracted together from the nickel solution with said organic extractant containing 15 to 70 volume percent tributyl phosphate, and wherein said iron in the oxidized state is extracted from said nickel raffinate with said organic extractant containing 5 to 35% tributyl phosphate.

4. The process of claim 2, wherein the copper and zinc are extracted together from said nickel chloride solution with said organic extractant containing about 15 to 50 volume percent of tributyl phosphate.

5. The process of claim 2, wherein the nickel chloride solution also contains at least about 1 gpl cobalt wherein the cobalt following the selective extraction of the copper and zinc remains with the nickel raffinate together with the ferrous iron, and wherein following the oxidation of the iron and the solvent extraction thereof from said raffinate, the cobalt is thereafter extracted with an organic extractant selective to cobalt to provide a nickel raffinate of high purity.

6. The process of claim 5, wherein the cobalt is extracted from the nickel raffinate with an organic solvent containing about 25 to 70 volume percent tributyl phosphate.

7. The process of claim 5, wherein the cobalt is extracted from the nickel raffinate with an organic solvent containing an amount of tri-iso-octylamine effective to extract substantially all of said cobalt.

8. The process of claim 1, wherein the nickel chloride solution contains the impurities iron, copper and zinc and at least about 1 gpl cobalt, wherein the iron in said solution is substantially in the ferric state but slightly underoxidized to provide a small but effective amount of ferrous iron ranging up to about 200 ppm sufficient to maintain the copper substantially in the extractable form, wherein said iron, copper and zinc are selectively extracted together using said organic extractant containing about 15 to 70 volume percent tributyl phosphate to provide a nickel raffinate containing said cobalt, and wherein said nickel raffinate is subjected to solvent extraction with an organic solvent selective to the extraction of cobalt.

9. The process of claim 8, wherein the cobalt is extracted from the nickel raffinate with an organic solvent containing about 25 to 70 volume percent tributyl phosphate.

10. The process of claim 8, wherein the cobalt is extracted from the nickel raffinate with an organic solvent containing an amount of tri-iso-octylamine effected to extract substantially all of said cobalt and provide a purified nickel solution containing not more than about 200 ppm of ferrous iron.

11. In a solvent extraction process for removing impurities from an aqueous nickel chloride acid solution containing about 50 gpl to 170 gpl Ni, at least about 1 gpl Co, and at least the impurities copper and iron selected from the group consisting of copper, iron and zinc, the improvement which comprises,
  providing said solution having a free hydrochloric acid concentration of about 0.2 N to 4 N and a total chloride content of about 4 to 10 N and in which sufficient amount of the iron is in the ferrous state such that the redox potential of the solution is at a value substantially less than 600 mv referenced to the Standard Calomel Electrode to maintain the copper in the extractable form,
  mixing said solution with an organic extractant of essentially about 5% to 70% by volume of tributyl phosphate dissolved in a water-immiscible organic solvent at a selected organic to aqueous solution volume ratio predetermined to extract substantially said copper from said aqueous solution and form a raffinate containing said nickel, said cobalt and said ferrous iron, and a loaded organic containing said copper impurity,
  and then separating said loaded organic from said raffinate to provide a nickel chloride raffinate solution containing cobalt and ferrous iron and substantially impoverished in said copper impurity.

12. The process of claim 11, wherein the nickel raffinate is oxidized to convert substantially all of the ferrous iron to the ferric state and the ferric iron thereafter extracted with an organic extractant containing about 5 to 35 volume percent tributyl phosphate and provide a nickel raffinate containing said cobalt and substantially free of said copper and iron impurities.

13. The process of claim 12, wherein the solution also contains zinc and the copper and zinc are extracted together from the nickel solution with said organic extractant containing 15 to 50 volume percent tributyl phosphate.

14. The process of claim 12, wherein following the oxidation of the iron and the solvent extraction thereof from said raffinate, the cobalt is thereafter extracted with an organic extractant selective to cobalt to provide a nickel raffinate of high purity.

15. The process of claim 14, wherein the cobalt is extracted from the nickel raffinate with an organic solvent containing about 50 to 70 volume percent tributyl phosphate.

16. The process of claim 14, wherein the cobalt is extracted from the nickel raffinate with an organic solvent containing an amount of tri-ios-octylamine effective to extract substantially all of said cobalt.

17. The process of claim 11, wherein the nickel chloride solution contains the impurities iron, copper and zinc, wherein the iron in said solution is substantially in the ferric state but slightly under-oxidized to provide a small but effective amount of ferrous iron ranging up to about 200 ppm sufficient to maintain the copper substantially in the extractable form, wherein said iron, copper and zinc are selectively extracted together using said organic extractant containing about 15 to 50 volume percent tributyl phosphate to provide a nickel raffinate containing said cobalt, and wherein said nickel raffinate is subjected to solvent extraction with an organic solvent selective to the extraction of cobalt.

18. The process of claim 17, wherein the cobalt is extracted from the nickel raffinate with an organic solvent containing about 50 to 70 volume percent tributyl phosphate.

19. The process of claim 17, wherein the cobalt is extracted from the nickel raffinate with an organic solvent containing an amount of tri-iso-octylamine effected to extract substantially all of said cobalt and provide a purified nickel solution containing no more than about 200 ppm of ferrous iron.

20. In a solvent extraction process for removing impurities from an aqueous nickel chloride acid solution containing about 170 gpl to 320 gpl Ni, at least about 1 gpl Co, and at least the impurities copper and iron selected from the group consisting of copper, iron and zinc, the improvement which comprises,
  providing said solution having a free hydrochloric acid concentration of about 0.2 N to 4 N and a total chloride content of about 4 to 11 N and in which sufficient amount of the iron is in the ferrous state such that the redox potential of the solution is at a value substantially less than 600 mv referenced to the Standard Calomel Electrode to maintain the copper in the extractable form,
  mixing said solution with an organic extractant of essentially about 5% to 70% by volume of tributyl phosphate dissolved in a water-immiscible organic solvent at a selected organic to aqueous solution volume ratio predetermined to extract substantially said copper from said aqueous solution and form a raffinate containing said nickel, said cobalt and said ferrous iron, and a loaded organic containing said copper impurity,
  and then separating said loaded organic from said raffinate to provide a nickel chloride raffinate solution containing cobalt and ferrous iron and substantially impoverished in said copper impurity.

21. The process of claim 20, wherein the nickel raffinate is oxidized to convert substantially all of the ferrous iron to the ferric state and the ferric iron thereafter extracted with an organic extractant containing 5 to 35 volume percent tributyl phosphate and provide a nickel raffinate substantially free of said copper and iron impurities.

22. The process of claim 21, wherein the solution also contains zinc and the copper and zinc are extracted together from the nickel solution with said organic extractant containing 15 to 50 volume percent tributyl phosphate.

23. The process of claim 21, wherein following the oxidation of the iron and the solvent extraction thereof from said raffinate, the cobalt is thereafter extracted with an organic extractant selective to cobalt to provide a nickel raffinate of high purity.

24. The process of claim 23, wherein the cobalt is extracted from the nickel raffinate with an organic solvent containing about 25 to 50 volume percent tributyl phosphate.

25. The process of claim 23, wherein the cobalt is extracted from the nickel raffinate with an organic solvent containing an amount of tri-iso-octylamine effective to extract substantially all of said cobalt.

26. The process of claim 20, wherein the nickel chloride solution contains the impurities iron, copper and zinc, wherein the iron in said solution is substantially in the ferric state but slightly under-oxidized to provide a small but effective amount of ferrous iron ranging up to about 200 ppm sufficient to maintain the copper substantially in the extractable form, wherein said iron, copper and zinc are selectively extracted together using said organic extractant containing about 15 to 50 volume percent tributyl phosphate to provide a nickel raffinate containing said cobalt, and wherein said nickel raffinate is subjected to solvent extraction with an organic solvent selective to the extraction of cobalt.

27. The process of claim 26, wherein the cobalt is extracted from the nickel raffinate with an organic solvent containing about 25 to 50 volume percent tributyl phosphate.

28. The process of claim 26, wherein the cobalt is extracted from the nickel raffinate with an organic solvent containing an amount of tri-iso-octylamine effected to extract substantially all of said cobalt and provide a purified nickel solution containing not more than about 200 ppm of ferrous iron.

29. The process of claim 20, wherein the nickel chloride solution together with the cobalt contains the impurities iron, copper and zinc, wherein the iron in said solution is substantially in the ferric state but slightly under-oxidized to provide a small but effective amount of ferrous iron ranging up to about 200 ppm sufficient to maintain the copper substantially in the extractable form, wherein said cobalt, iron, copper and zinc are extracted together using an organic extractant containing 20 to 70 volume percent tributyl phosphate to provide a nickel raffinate substantially impoverished in said cobalt, iron, copper and zinc.

30. The process of claim 29, wherein the free acid of said nickel chloride solution is at least about 0.5 N HCl and wherein the concentration of said tributyl phosphate ranges from about 25 to 50 volume percent.

31. The process of claim 30, wherein said free acid ranges from about 1 to 2 N HCl.

32. In a continuous solvent extraction process for purifying an aqueous nickel chloride-hydrochloric acid feed solution containing about 50 to 320 gpl Ni, optionally at least about 1 gpl Co, and at least one impurity selected from the group consisting of copper, iron and zinc, the improvement which comprises, providing said feed solution having a free hydrochloric acid concentration ranging from about 0.2 N to 4 N and a total chloride concentration ranging from about 4 to 11 N, subjecting said solution to mixing in a series of solvent extraction multiple stages with an organic extractant of essentially about 5% to 70% by volume of tributyl phosphate dissolved in a water-immiscible organic solvent at a selected organic to aqueous solution volume ratio predetermined to extract substantially at least said one impurity by flowing said solution through said multiple stages countercurrent to the flow of the organic extractant to produce a nickel raffinate impoverished in said impurity and a loaded organic containing said impurity and residual nickel, separating said loaded organic from said raffinate, subjecting said loaded organic to multi-stage scrubbing with water to remove selectively said residual nickel present by mixing said water countercurrent to the flow of said loaded organic and provide a scrub product containing said nickel, combining the scrub product with the aqueous feed solution fed to said multiple solvent extraction stages, stripping said scrubbed organic of said at least one impurity with dilute hydrochloric acid flowing countercurrently to the flow of said organic through a series of multiple stripping stages, subjecting said stripped organic to a cleaning operation, and recycling the cleaned organic to said multiple solvent extraction stages.

33. The process of claim 32, wherein said at least one impurity is copper and wherein the redox potential of the solution is controlled to a value substantially less than 600 mv referenced to the Standard Calomel Electrode conducive to maintaining a substantial portion of the copper in the extractable state.

34. The process of claim 32, wherein the nickel chloride solution contains the impurities of iron, copper and zinc in which the iron is substantially in the ferrous state such that the redox potential of the solution is at a value substantially less than 600 mv referenced to the Standard Calomel Electrode to maintain the copper in the extractable form, such that the copper and zinc are extracted together with said organic extractant to provide a nickel raffinate containing substantial amounts of ferrous iron, following which said nickel raffinate is oxidized to convert substantially all of the ferrous iron to the ferric state and the ferric iron thereafter extracted with an organic extractant containing 5 to 70 volume percent tributyl phosphate and provide a nickel raffinate substantially free of said impurities.

35. The process of claim 34, wherein the copper and zinc are extracted together from the nickel solution with said organic extractant containing 15 to 70 volume percent tributyl phosphate, and wherein said iron in the oxidized state is extracted from said nickel raffinate with said organic extractant containing 5 to 35% tributyl phosphate.

36. The process of claim 34, wherein the copper and zinc are extracted together from said nickel chloride solution with said organic extractant containing about 15 to 50 volume percent of tributyl phosphate.

37. The process of claim 34, wherein the nickel chloride solution also contains at least about 1 gpl cobalt wherein the cobalt following the selective extraction of the copper and zinc remains with the nickel raffinate together with the ferrous iron, and wherein following the oxidation of the iron and the solvent extraction thereof from said raffinate, the cobalt is thereafter extracted from said nickel raffinate with an organic extractant selective to cobalt to provide a nickel raffinate of high purity.

38. The process of claim 37, wherein the cobalt is extracted from the nickel raffinate with an organic solvent containing about 25 to 70 volume percent tributyl phosphate.

39. The process of claim 37, wherein the cobalt is extracted from the nickel raffinate with an organic solvent containing an amount of tri-iso-octylamine effective to extract substantially all of said cobalt.

40. The process of claim 32, wherein the nickel chloride solution contains the impurities iron, copper and zinc and at least about 1 gpl cobalt, wherein the iron in said solution is substantially in the ferric state but slightly under-oxidized to provide a small but effective amount of ferrous iron ranging up to about 200 ppm sufficient to maintain the copper substantially in the extractable form, wherein said iron, copper and zinc are selectively extracted together using said organic extractant containing about 15 to 70 volume percent tributyl phosphate to provide a nickel raffinate containing said cobalt, and wherein said nickel raffinate is subjected to solvent extraction with an organic solvent selective to the extraction of cobalt.

41. The process of claim 40, wherein the cobalt is extracted from the nickel raffinate with an organic solvent containing about 25 to 70 volume percent tributyl phosphate.

42. The process of claim 40, wherein the cobalt is extracted from the nickel raffinate with an organic solvent containing an amount of tri-iso-octylamine effected to extract substantially all of said cobalt and provide a purified nickel solution containing not more than about 200 ppm of ferrous iron.

43. In a continuous solvent extraction process for purifying an aqueous nickel chloride-hydrochloride acid feed solution containing about 50 to 170 gpl Ni, at least about 1 gpl Co, and at least one impurity selected from the group consisting of copper, iron and zinc, the improvement which comprises, providing said feed solution having a free hydrochloride acid concentration ranging from about 0.2 N to 4 N and a total chloride concentration ranging from about 4 to 10 N, subjecting said solution to mixing in a series of solvent extraction multiple stages with an organic extractant of essentially about 5% to 70% by volume of tributyl phosphate dissolved in a water-immiscible organic solvent at a selected organic to aqueous solution volume ratio predetermined to extract substantially at least said one impurity by flowing said solution through said multiple stages countercurrent to the flow of the organic extractant to produce a nickel raffinate impoverished in said impurity and a loaded organic containing said impurity and residual nickel, separating said loaded organic from said raffinate, subjecting said loaded organic to multi-stage scrubbing with water to remove selectively at least said residual nickel present by mixing said water countercurrent to the flow of said loaded organic and provide a scrub product containing said nickel, combining the scrub product with the aqueous feed solution fed to said multiple solvent extraction stages, stripping said scrubbed organic of said at least one impurity with dilute hydrochloric acid flowing countercurrently to the flow of said organic through a series of multiple stripping stages, subjecting said stripped organic to a cleaning operation, and recycling the cleaned organic to said multiple solvent extraction stages.

44. The process of claim 43, wherein said at least one impurity is copper and wherein the redox potential of the solution is controlled to a value substantially less than 600 mv referenced to the Standard Calomel Electrode conducive to maintaining a substantial portion of the copper in the extractable state.

45. The process of claim 43, wherein the nickel chloride solution contains the impurities of iron, copper and zinc in which the iron is substantially in the ferrous state such that the redox potential of the solution is at a value substantially less than 600 mv referenced to the Standard Calomel Electrode to maintain the copper in the extractable form, such that the copper and zinc are extracted together with said organic extractant to provide a nickel raffinate containing substantial amounts of ferrous iron, following which said nickel raffinate is oxidized to convert substantially all of the ferrous iron to the ferric state and the ferric iron thereafter extracted with an organic extractant containing 5 to 35 volume percent tributyl phosphate and provide a nickel raffinate substantially free of said impurities.

46. The process of claim 45, wherein the copper and zinc are extracted together from the nickel solution with said organic extractant containing 15 to 50 volume percent tributyl phosphate.

47. The process of claim 45, wherein following the oxidation of the iron and the solvent extraction thereof from said raffinate, the cobalt is thereafter extracted with an organic extractant selective to cobalt to provide a nickel raffinate of high purity.

48. The process of claim 47, wherein the cobalt is extracted from the nickel raffinate with an organic solvent containing about 50 to 70 volume percent tributyl phosphate.

49. The process of claim 45, wherein the cobalt is extracted from the nickel raffinate with an organic solvent containing an amount of tri-iso-octylamine effective to extract substantially all of said cobalt.

50. The process of claim 43, wherein the nickel chloride solution contains the impurities iron, copper and zinc, wherein the iron in said solution is substantially in the ferric state but slightly under-oxidized to provide a small but effective amount of ferrous iron ranging up to about 200 ppm sufficient to maintain the copper substantially in the extractable form, wherein said iron, copper and zinc are selectively extracted together using said organic extractant containing about 15 to 50 volume percent tributyl phosphate to provide a nickel raffinate containing said cobalt, and wherein said nickel raffinate is subjected to solvent extraction with an organic solvent selective to the extraction of cobalt.

51. The process of claim 50, wherein the cobalt is extracted from the nickel raffinate with an organic solvent containing about 50 to 70 volume percent tributyl phosphate.

52. The process of claim 50, wherein the cobalt is extracted from the nickel raffinate with an organic solvent containing an amount of tri-iso-octylamine effected to extract substantially all of said cobalt and provide a purified nickel solution containing not more than about 200 ppm of ferrous iron.

53. In a continuous solvent extraction process for purifying an aqueous nickel chloride-hydrochloric acid feed solution containing about 170 to 320 gpl Ni, at least about 1 gpl Co, and at least one impurity selected from the group consisting of copper, iron and zinc, the improvement which comprises, providing said feed solution having a free hydrochloric acid concentration ranging from about 0.2 N to 4 N and a total chloride concentration ranging from about 4 to 11 N, subjecting said solution to mixing in a series of solvent extraction multiple stages with an organic extractant of essentially about 5% to 70% by volume of tributyl phosphate dissolved in a water-immiscible organic solvent at a selected organic to aqueous solution volume ratio predetermined to extract substantially at least said one impurity by flowing said solution through said multiple stages countercurrent to the flow of the organic extractant to produce a nickel raffinate impoverished in said impurity and a loaded organic containing said impurity and residual nickel, separating said loaded organic from said raffinate, subjecting said loaded organic to multi-stage scrubbing with water to remove selectively said residual nickel present by mixing said water countercurrent to the flow of said loaded organic and provide a scrub product containing said nickel, combining the scrub product with the aqueous feed solution fed to said multiple solvent extraction stages, stripping said scrubbed organic of said at least one impurity with water or dilute hydrochloric acid flowing countercurrently to the flow of said organic through a series of multiple stripping stages, subjecting said stripped organic to a cleaning operation and, recycling the cleaned organic to said multiple solvent extraction stages.

54. The process of claim 53, wherein said at least one impurity is copper and wherein the redox potential of the solution is controlled to a value substantially less than 600 mv referenced to the Standard Calomel Electrode conducive to maintaining a substantial portion of the copper in the extractable state.

55. The process of claim 53, wherein the nickel chloride solution contains the impurities of iron, copper and zinc in which the iron is substantially in the ferrous state such that the redox potential of the solution is at a value substantially less than 600 mv referenced to the Standard Calomel Electrode to maintain the copper in the extractable form, such that the copper and zinc are selectively extracted together with said organic extractant to provide a nickel raffinate containing said cobalt and substantial amounts of ferrous iron, following which said nickel raffinate is oxidized to convert substantially all of the ferrous iron to the ferric state and the ferric iron thereafter extracted with an organic extractant containing 5 to 35 volume percent tributyl phosphate and provide a nickel raffinate substantially free of said impurities.

56. The process of claim 55, wherein the copper and zinc are extracted together from the nickel solution with said organic extractant containing 15 to 50 volume percent tributyl phosphate.

57. The process of claim 55, wherein following the oxidation of the iron and the solvent extraction thereof from said raffinate, the cobalt is thereafter extracted with an organic extractant selective to cobalt to provide a nickel raffinate of high purity.

58. The process of claim 57, wherein the cobalt is extracted from the nickel raffinate with an organic solvent containing about 25 to 50 volume percent tributyl phosphate.

59. The process of claim 57, wherein the cobalt is extracted from the nickel raffinate with an organic solvent containing an amount of tri-iso-octylamine effective to extract substantially all of said cobalt.

60. The process of claim 53, wherein the nickel chloride solution contains the impurities iron, copper and zinc, wherein the iron in said solution is substantially in the ferric state but slightly under-oxidized to provide a small but effective amount of ferrous iron ranging up to about 200 ppm sufficient to maintain the copper substantially in the extractable form, wherein said iron, copper and zinc are selectively extracted together using said organic extractant containing about 15 to 50 volume percent tributyl phosphate to provide a nickel raffinate containing said cobalt, and wherein said nickel raffinate is subjected to solvent extraction with an organic solvent selective to the extraction of cobalt.

61. The process of claim 60, wherein the cobalt is extracted from the nickel raffinate with an organic solvent containing about 25 to 50 volume percent tributyl phosphate.

62. The process of claim 60, wherein the cobalt is extracted from the nickel raffinate with an organic solvent containing an amount of tri-iso-octylamine effected to extract substantially all of said cobalt and provide a purified nickel solution containing not more than about 200 ppm of ferrous iron.

63. The process of claim 53, wherein the nickel chloride solution together with the cobalt contains the impurities iron, copper and zinc and has an acid concentration of at least about 0.5 N HCl, wherein the iron in said solution is substantially in the ferric state but slightly under-oxidized to provide a small but effective amount of ferrous iron ranging up to about 200 ppm sufficient to maintain the copper substantially in the extractable form, wherein said cobalt, iron, copper and zinc are extracted together using an organic extractant containing 25 to 50 volume percent tributyl phosphate to provide a nickel raffinate substantially impoverished in said cobalt, iron, copper and zinc.

64. The process of claim 63, wherein said free acid ranges from about 1 to 2 N HCl.

65. The process of claim 63, wherein the loaded organic is selectively stripped of said cobalt with a water scrub and wherein said cobalt-stripped organic is thereafter stripped of said impurities using water or a dilute hydrochloric acid solution.

* * * * *